No. 12,111. REISSUED MAY 19, 1903.

G. E. McCORMACK.

EYELET.

APPLICATION FILED FEB. 20, 1903.

Witnesses.
H. A. Berrigan.
Delos Holden.

Inventor.
George E. McCormack,
By
Betts Betts Sheffield & Betts
his Attorneys

No. 12,111. Reissued May 19, 1903.

UNITED STATES PATENT OFFICE.

GEORGE E. McCORMACK, OF EAST BRIDGEWATER, MASSACHUSETTS, ASSIGNOR, BY MESNE ASSIGNMENTS, TO J. C. RHODES & CO., INCORPORATED, OF PORTLAND, MAINE, AND NEW BEDFORD, MASSACHUSETTS, A CORPORATION OF MAINE.

EYELET.

SPECIFICATION forming part of Reissued Letters Patent No. 12,111, dated May 19, 1903.

Original No. 708,577, dated September 9, 1902. Application for reissue filed February 20, 1903. Serial No. 144,346.

*To all whom it may concern:*

Be it known that I, GEORGE E. McCORMACK, a citizen of the United States, residing in East Bridgewater, in the county of Plymouth, State of Massachusetts, have invented a certain new and useful Improvement in Eyelets, of which the following is a specification.

This invention relates to eyelets made, preferably, of sheet metal and of the class which are provided with setting flanges or heads, such eyelets being used principally, but not necessarily exclusively, in connection with leather boots and shoes; and the invention has for its object to provide an eyelet which while light in weight has a flange which is heavy in proportion to the band and very strong and stiff, so that the band can easily spread under the pressure of the setting-tools without any yielding or deformation of or injury to the flange and whereby the paint or enamel cannot easily crack off from the flange.

My present invention comprises an eyelet the flange of which consists of two thicknesses or layers of metal, said thicknesses being folded against each other, so that the under thickness is in actual contact for its entire width and length with the upper thickness, the two thicknesses or layers being concavo-convex in cross-section and concentric and with their grooved or hollow portion facing downward and the under layer being preferably thicker or heavier than the upper layer, all as fully described below, and illustrated in the accompanying drawings, in which—

Figure 5:
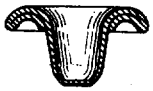
Figure 6:
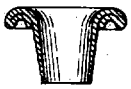
Figure 7:
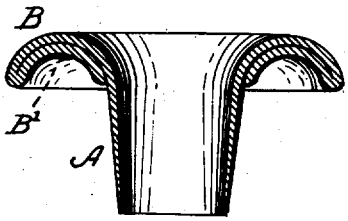

Figures 1 to 6, inclusive, are transverse vertical sections illustrating the different steps in the method by which my improved eyelet is preferably constructed from the blank. Fig. 7 is a similar section of the complete eyelet embodying my invention. In each of these figures the eyelet is shown on an enlarged scale, Figs. 1 to 6, inclusive, showing it as on a scale about one-half the size of the scale indicated in Fig. 7.

Figure 1:
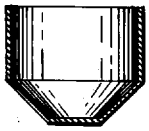
Figure 2:
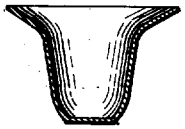
Figure 3:
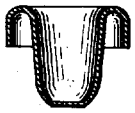
Figure 4:
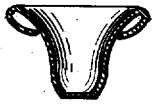

To form the eyelet, a cup, substantially as illustrated in Fig. 1, is made from a round blank, and from this cup the form illustrated in Fig. 2 is constructed, the upper part of which shows the beginning of a flange. This flange is then turned down into the shape indicated in Fig. 3 and then inward into the shape indicated in Fig. 4, in which the flange comprises two thicknesses of the metal. The barrel is then drawn in slightly and the flange rolled, as shown in Fig. 5, and the barrel is then pierced, as shown in Fig. 6. In Fig. 7 the device is complete and shows the barrel A tapered or growing thinner toward its lower end and with its upper portion spreading into a flange, which consists of the upper layer or thickness B and the lower layer or thickness B′. The lower layer is somewhat thicker than the upper layer, is in contact with it throughout its entire length and width, and the flange thus constructed is concavo-convex in cross-section and with its concave or hollow side facing downward. This flange is not only relatively heavy as compared with the barrel, but is by reason of its shape exceedingly strong and stiff, so that the enamel or paint applied to the flange will not be in danger of cracking off. Moreover, when the eyelet is applied the flange is reinforced or strengthened, for the reason that the leather, cloth, or other material in which the eyelet is used fills up the groove or cavity under the flange. The barrel, especially the lower portion of it, is relatively thin, and hence can be easily spread under the pressure of the setting-tools, while the thickness and stiffness of the flange prevent its being forced out of shape.

The eyelet illustrated in the accompanying drawings shows the preferred and most perfect form of my eyelet, in which the lower thickness or layer of the flange is in actual contact throughout the entire width and circumference or length of the upper thickness of the layer—that is, both layers are substantially coextensive; but it should be understood that the invention is not limited to an eyelet in which the lower layer is in contact with the upper layer throughout the entire width and length of the upper layer.

While the method of manufacture above described may be a preferable one, yet I do not desire to confine myself to such method in all or any of its steps.

Having thus fully described my invention, what I claim, and desire to secure by Letters Patent, is—

1. The herein-described improved sheet-metal eyelet, comprising a barrel A, and the circular flange consisting of two thicknesses or layers of metal B, B′, concentric in cross-section and in physical contact with each other throughout their entire width and circumference or length, the peripheral portion B′ of the metal constituting the flange being folded under the portion B, and corresponding in shape thereto, and the flange being formed to produce an annular groove on its under surface, substantially as set forth.

2. The herein-described improved sheet-metal eyelet, comprising a barrel A, and a flange consisting of two thicknesses or layers of metal, B, B′, the lower layer being folded under the upper layer and in actual contact therewith throughout the entire width and length of said lower layer, and the flange being formed to produce an annular groove on its under surface, substantially as set forth.

In testimony whereof I have signed my name to this specification in the presence of two subscribing witnesses.

GEORGE E. McCORMACK.

Witnesses:

BERTHA L. HANNAH,

NELSON W. HOWARD.